United States Patent [19]
Johnson et al.

[11] Patent Number: 5,910,659
[45] Date of Patent: Jun. 8, 1999

[54] FLAT PANEL THERMAL INFRARED GENERATOR

[75] Inventors: Ralph Barry Johnson, Huntsville, Ala.; Michael Gaitan, North Potomac, Md.; Ronald C. L. Chung, Huntsville, Ala.

[73] Assignee: The United States of America as represented by the Secretary of Commerce, Washington, D.C.

[21] Appl. No.: 08/640,341

[22] Filed: Apr. 30, 1996

[51] Int. Cl.⁶ .................................................... G01J 4/00
[52] U.S. Cl. ................................... 250/495.1; 250/504 R
[58] Field of Search ............................ 250/493.1, 495.1, 250/504 R

[56] References Cited

U.S. PATENT DOCUMENTS

| | | |
|---|---|---|
| 3,949,231 | 4/1976 | Blunck et al. . |
| 4,419,692 | 12/1983 | Modisette et al. ....................... 250/334 |
| 4,596,935 | 6/1986 | Lumpp . |
| 4,724,356 | 2/1988 | Daehler . |
| 4,754,139 | 6/1988 | Ennulat et al. . |
| 4,754,141 | 6/1988 | Mindock . |
| 4,769,527 | 9/1988 | Hart et al. . |
| 4,859,080 | 8/1989 | Titus et al. . |
| 4,922,116 | 5/1990 | Grinberg et al. . |
| 5,047,644 | 9/1991 | Meissner et al. . |
| 5,074,490 | 12/1991 | Muse et al. .......................... 250/504 R |
| 5,091,646 | 2/1992 | Taylor . |
| 5,261,747 | 11/1993 | Deacutis et al. . |
| 5,264,326 | 11/1993 | Meissner et al. . |
| 5,265,958 | 11/1993 | Ludlow . |
| 5,291,022 | 3/1994 | Drake et al. ......................... 250/504 R |
| 5,468,961 | 11/1995 | Gradon et al. .......................... 250/343 |
| 5,483,088 | 1/1996 | Chen et al. .......................... 250/493.1 |
| 5,668,376 | 9/1997 | Weckstrom et al. .................. 250/495.1 |

OTHER PUBLICATIONS

"Design Methodology for Micromechanical Systems at Commercial CMOS Foundries Through MOSIS", Michael Gaitan et al, National Institute of Standards and Technology, Gaithersburg, MD 2089; pp. 1–4, 1992.

"Dynamic RAM Imaging Display Technology Utilizing Silicon Blackbody Emitters", Larry Burriesci, SPIE, vol. 765, Imaging Sensors and Displays, pp. 112–122, (1987).

"Commercial CMOS Foundry Thermal Display for Dynamic thermal Scene Simulation", Michael Gaitan et al, National Institute of Standards and Technology, Gaithersburg, MD 20899, Proceeding at SPIE, Orlando, Florida, Apr. 1993, pp. 1–7.

"Micromachined Thermal Radiation Emitter from a Commercial CMOS Process", M. Parameswaran et al, 1991 IEEE Electron Device Letters, vol. 12, No. 2, Feb. 1991.

"Infrared Display Array", Max Daehler, SPIE, vol. 765, Imaging Sensors and Displays, pp. 94–101, (1987).

"Thermal Scene Projectors Using Microemitters", Donald R. Stauffer, Honeywell Systems and Research Center, Optical Engineering, Nov. 1991, vol. 30, No. 11, pp. 1664–1667.

"Silicon Micromechanics: SUSS has Total System Solutions", Optical Engineering, vol. 30. No. 11, pp. 1–2–(Nov. 1991).

"High Level CAD Melds Micromachined Devices With Foundries", Circuits and Devices, M. Parameswaran et al, pp. 10–15, (Nov. 1992), National Institutes of Standard Technology.

*Primary Examiner*—Bruce Anderson
*Attorney, Agent, or Firm*—McDermott, Will & Emery

[57] ABSTRACT

A thermal cell has an infrared source element for producing an infrared signal and a spatial decorrelator element which spatially decorrelates the generated infrared signal to increase the fill factor of the thermal cell. The infrared source element includes an infrared generating cell, with a resistive element. The spatial decorrelator element is disposed above and spaced apart from the infrared source element and has an aperture formed therein and through which the infrared signal radiates. The aperture extends substantially orthogonal to the primary surface of the source element and between primary surfaces of the decorrelator element, which are in turn substantially parallel with the source element primary surface. The side walls of the aperture reflect the infrared signal. The opening in the primary surface of the decorrelator element which is furthest from the primary surface of the source element has an area which is greater than that of the opening in the primary surface of the decorrelator element which is closest to the primary surface of the source element.

23 Claims, 7 Drawing Sheets

FLAT PANEL THERMAL INFRARED GENERATOR

BACKGROUND OF THE INVENTION

1. Field of the Invention

The present invention relates generally to infrared signal generating devices and more particularly to an improved micro-scale thermal infrared cell and array particularly suitable for testing infrared sensors.

2. Description of the Related Art

In thermal imaging systems, emitted infrared radiation is imaged on an imaging plane so that the infrared radiation can be converted into electrical signals, typically by a plurality of detectors. The electrical signals are then processed for output on, for example, a display or tangible medium which can be viewed by a user, or utilized by a data processor. Thermal imaging systems are particularly useful in specialized applications where observation of self-emission of objects is desired, e.g., night-time military actions, fire fighting, industrial monitoring, etc. In order to test infrared imaging devices, infrared radiation generating devices must be utilized. It is important during the test phase that such devices evaluate the functional performance of the imaging devices and realistically simulate anticipated operational scenarios. However, this requirement must be balanced against the cost and complexity of the infrared generating device. A number of different types of infrared generating devices for simulating anticipated operational scenarios of thermal imaging systems have been developed or proposed.

Techniques have been developed which significantly improve infrared generating devices for use in system testing and simulating operational scenarios. For example, techniques have been developed to reduce flicker and weight, and to improve the thermal range, response time and efficiency of such devices. Techniques have also been developed for thermally isolating resistive heater elements from the semiconductor substrate of an infrared image generating device.

However, even utilizing the most recently proposed techniques, in order to accurately and realistically simulate anticipated operational scenarios, the emitting area of the resistive element must be relatively large. Accordingly, a substantial amount of power is required to drive the resistive element to produce the infrared radiation necessary for test or simulation of infrared imaging devices. This adds to the cost and complexity of the device. Furthermore, large resistive elements have a relatively large time constant, and take a relatively long period of time to reach the temperature necessary to produce specific infrared radiation, e.g., 600° C., and are thermally less stable than more compact resistive elements. Additionally, because of the large amount of heat which is produced by large resistive elements, control circuitry for driving, controlling and monitoring the infrared generating cells have necessarily been located external from the infrared generating cells. This results in a more cumbersome structure as well as increased signal losses and other deleterious consequences which are well known.

OBJECTIVES OF INVENTION

Accordingly, it is an objective of the present invention to provide a infrared generating device which requires less power, generates less heat and is thermally more robust and temporally responsive than conventional infrared generating cells.

It is another object of the invention to improve the radiometric efficiency of the infrared generating device.

It is a further objective of the present invention to provide an infrared generating device with thermal cells which can be integrated with other associated circuitry monolithically on the integrated circuit chip.

It is still a further object of the present invention to provide an infrared generating device with a large array of infrared generating cells and associated circuitry using a standard CMOS manufacturing process.

It is yet another object of the present invention to provide an infrared generating device with a relatively small resistive element which functionally emulates conventional infrared generating devices having a much larger resistive heater element.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

In accordance with the present invention, a thermal cell is provided with an infrared source element for producing an infrared signal. The infrared source element may include a semiconductor substrate, the primary surface of which may have a cavity formed therein. An infrared generating cell, with a resistive element, is disposed on a primary emitting surface of the infrared source element, e.g., bridging the cavity.

A spatial decorrelator element, formed for example of electro-formed nickel over an aluminum mandrel, spatially decorrelates the infrared signal and enhances the apparent radiant efficiency of the signal. The decorrelator element may be located above and spaced apart from the infrared source element preferably at as close a distance as practicable, for example at a distance on the order of 5 micrometers or less. The decorrelator element has an aperture through which the generated infrared signal is radiated. The aperture, has a centerline substantially orthogonal to the primary surface of the infrared source element and extends between primary surfaces of the decorrelator element. The primary surfaces of the decorrelator element are substantially parallel with the primary surface of the infrared source element, with one of the decorrelator element primary surfaces being proximate to but slightly separated from the primary surface of the source element. The aperture side walls are capable of reflecting the infrared signal. At the primary decorrelator element surface which is proximate to the primary surface of the source element, the aperture has an area which is smaller than the area of the aperture at the primary decorrelator element surface which is more distant from the source element primary surface.

Because of the reflection of the radiated infrared signal off the side walls of the decorrelator element aperture, the infrared signal is spatially decorrelated between the source element primary surface at which the signal is incident and the primary decorrelator element surface which is distal thereto. This decorrelation advantageously results in the optical fill ratio at the distal primary decorrelator element surface being significantly greater than the optical fill ratio at the primary surface of the source element. It will be understood that the fill factor or ratio is computed by dividing the area in a particular plane over which the infrared signal radiates by the area of the source element primary surface which supports the infrared generating cell, i.e., the total pixel area. Furthermore, due to the spatial decorrelation of the infrared signal, the signal radiance of the infrared signal at the distal primary decorrelator element surface is approximately equal to the signal radiance of the infrared signal at the primary surface of the source element.

Multiple thermal cells can be beneficially formed on a single semiconductor substrate to provide a thermal cell array, such as a matrix array, which includes an infrared source element with an array of infrared generating cells, each having a resistive element in the source element primary surface. Correspondingly, the signal decorrelator element has an array of apertures, each aperture being associated with a respective cell. Beneficially, the cell array can be fabricated using conventional IC based processes.

Preferably, a microsphere is placed in each of certain cavities formed in the primary substrate surface. For certain applications it may be beneficial to fixedly mount, e.g. glue, the microspheres in the cavities while in others it may be preferable to have the microspheres removable from the cavities. The microspheres allow the decorrelator element to be supported from the substrate and also space the decorrelator element from the infrared source element.

The spatial decorrelator element is held off of the substrate in order to provide thermal isolation between the decorrelator element and heater elements. This maintains a low thermal time constant for the heater, assuming that radiant heat transfer is minimal compared to conductive heat transfer between the heater element and substrate.

It is also possible to integrally incorporate the spatial decorrelator element in the silicon substrate by controlling the substrate thickness and anisotropically etching from the back side of the substrate. Thermal isolation is inherent.

If desired, large thermal cell arrays can be formed using multiple semiconductor substrates, each having an array of infrared generating cells which can be formed using conventional IC based processes. The respective substrates are positioned side by side to form a large thermal cell array. Each substrate beneficially has the cell drive, control and monitoring circuitry necessary for the cell array integrated thereon.

DESCRIPTION OF THE PREFERRED EMBODIMENT

Figure 1:
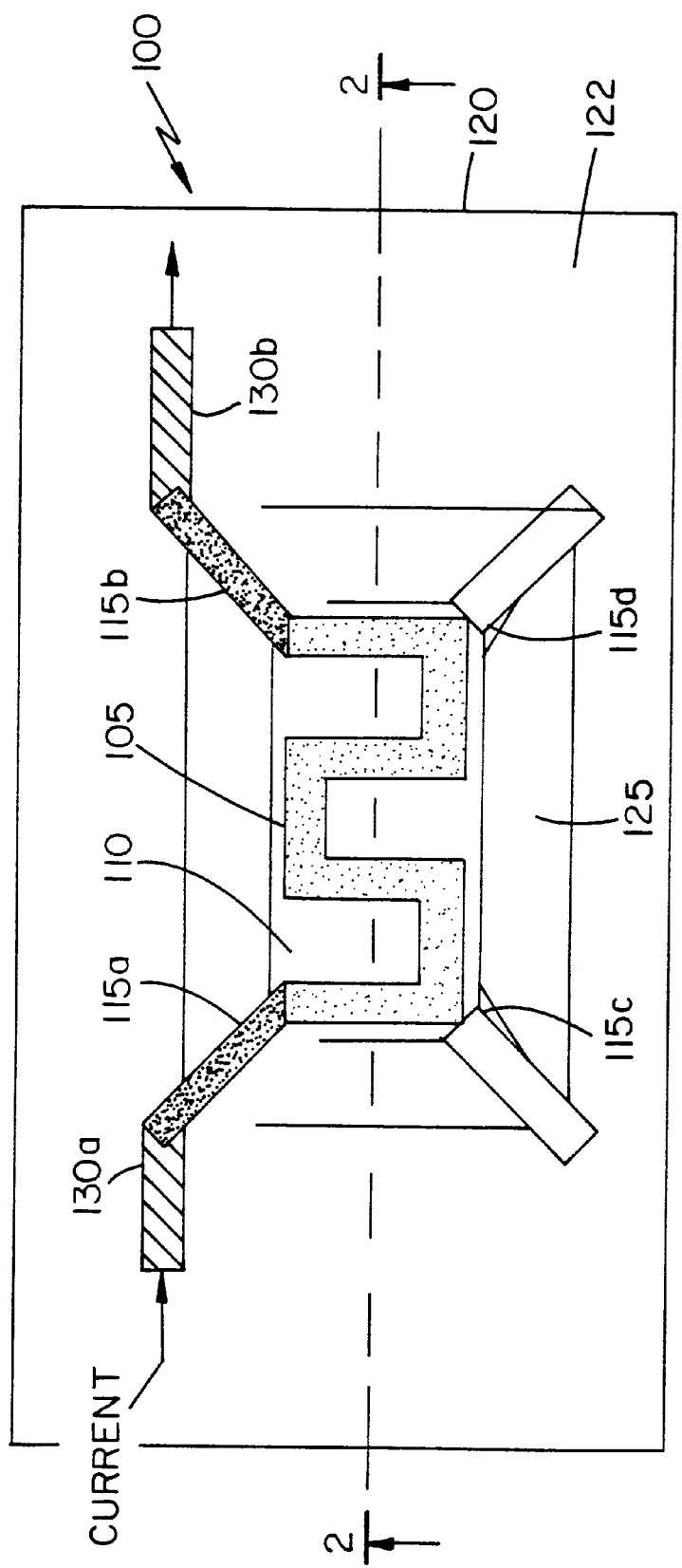
FIG. 1 is a top view of an infrared source element of the type utilized in the present invention.

FIG. 1 depicts a micro-scale heater, i.e. infrared source element 100, which can be fabricated using CMOS-compatible micro-machining techniques. Using such techniques, only a single maskless etch of the silicon chip is required to create the suspended membrane device by etching the chip's surface to remove the. silicon under the resistive heater element 105. This facilitates the manufacture of the chips using commercial CMOS foundry processes rather than costly custom IC fabrication. The micro-heater element includes a resistive heater element 105 supported by a membrane 110. The membrane structure is shaped like a trampoline with four support members 115*a–d* which suspend or bridge the heater element 105 over a cavity 125, as shown in FIG. 2, in the primary surface 122 of the semiconductor substrate 120.

Figure 2:
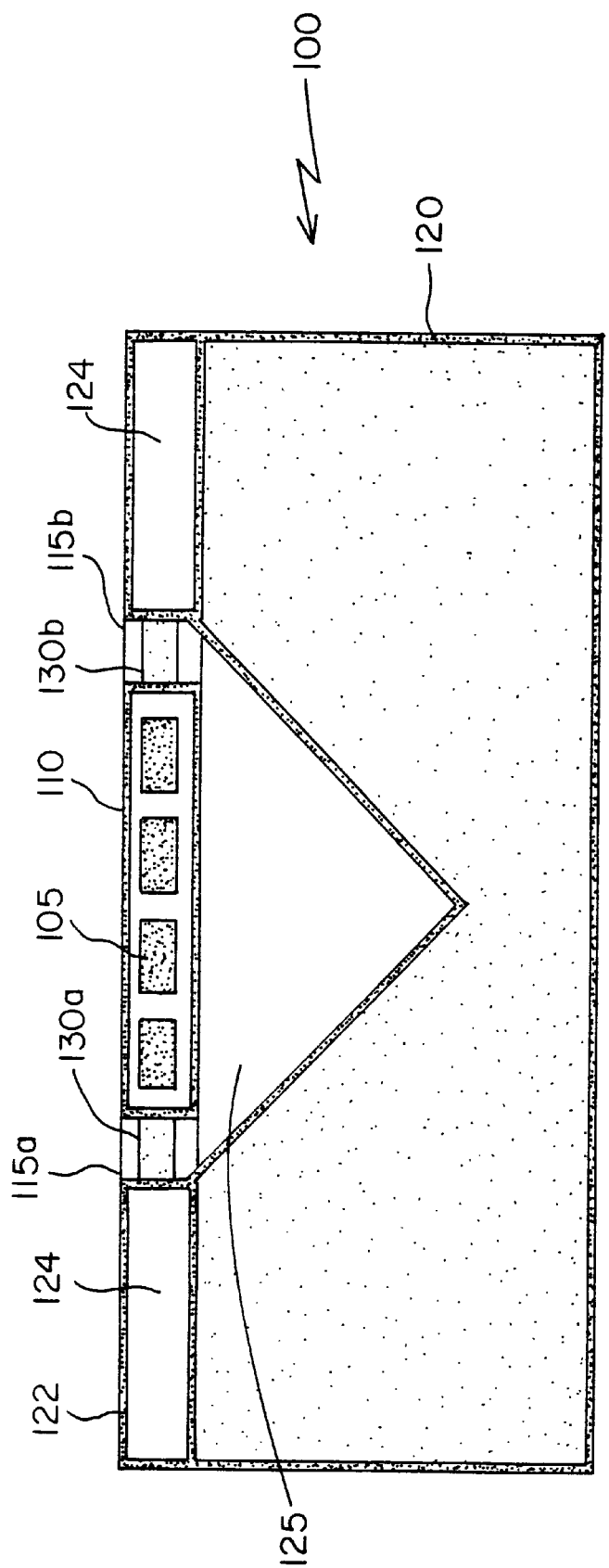
FIG. 2 is a cross-sectional view of the infrared source element FIG. 1.

As depicted in FIG. 2, the membrane 110 suspends the heater element 105 so as to bridge the cavity 125 formed in the semiconductor substrate 120. The cavity 125 is preferably formed by etching the primary surface 122 of the substrate 120. The cavity 125 is in the shape of an inverted pyramid due to anisotropic etching, and the resistive heater element 105 is substantially centered by the membrane 110 over the cavity 125. Typically, an $SiO_2$ passivity layer 124 forms the entire outer surface of the substrate 120 and acts as a mask to protect the substrate 120 from the etchant. The layer 124 is in the same plane as the primary surface of the heater element 105. However, the cavity could be formed by other etchants such as $XeF_2$ and other geometric shapes for the cavity could be utilized if desired.

The heater element 105 is formed of a polysilicon layer or other resistive material with aluminum lines 130*a–b* serving as the electrical contacts for providing electric current to and from the resistive heater element 105. The electrical contacts may beneficially be positioned closer to or over the cavity depending on the particular implementation. The membrane 110 and supports 115*a–d* supporting the heater element 105 are formed of a glass passivation layer that may encapsulate the heater element 105 and together structurally support the heater element 105 over the cavity 125. It will be understood that the membrane and supports could be formed of other materials if desired. Further details of infrared source element 100 are elaborated in "Flat Panel Thermal Infrared Scene Generator" by R. Barry Johnson, Ronald Chung, Michael Gaitan and David Berning, Proc. SPIE 2269, pp. 338–347 (1994).

Figure 3:
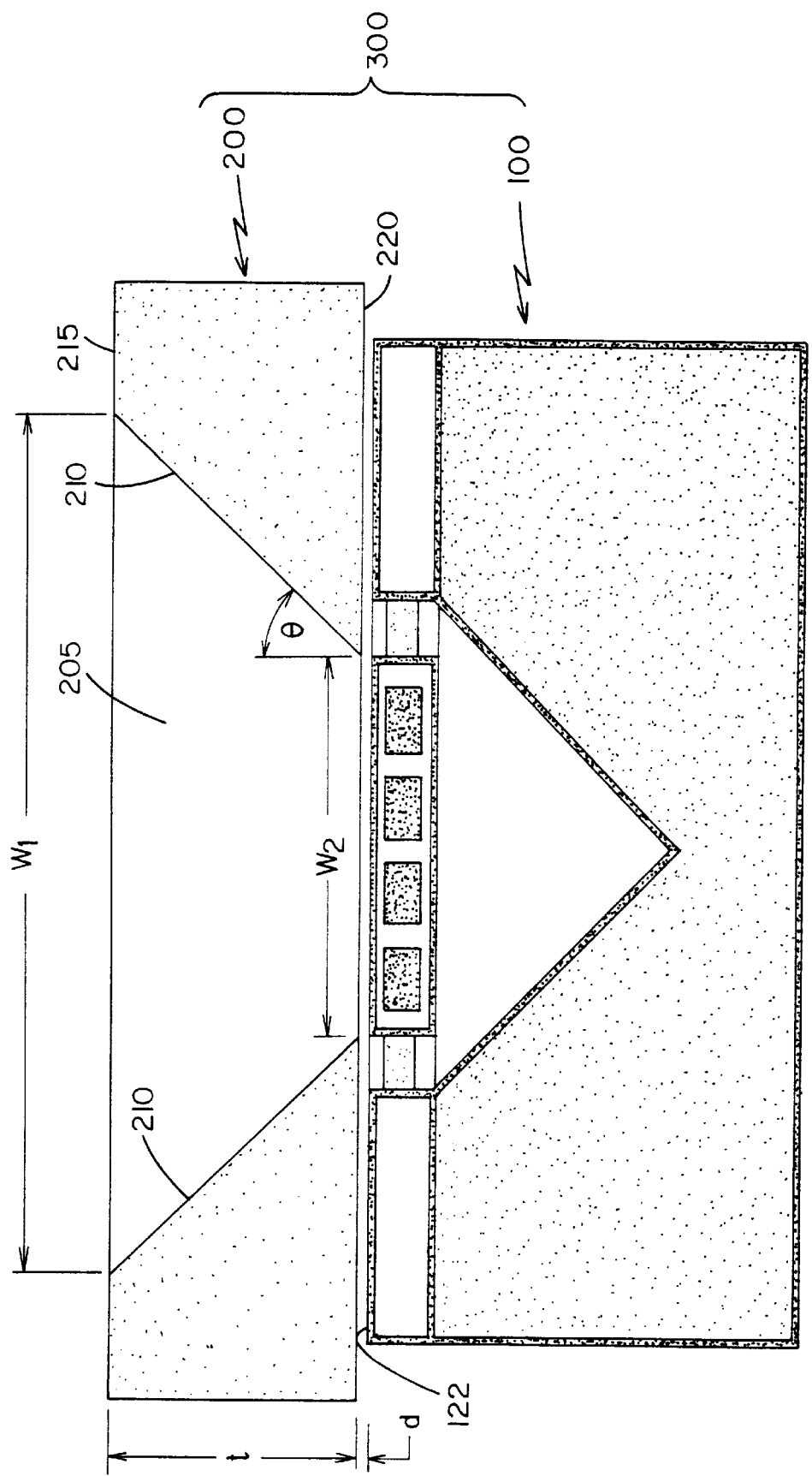
FIG. 3 is a cross-section of a thermal cell in accordance with the present invention which incorporates the infrared source element depicted in FIGS. 1 and 2.

FIG. 3 depicts a thermal cell 300 in accordance with the present invention. As shown, the infrared source element 100 depicted in FIGS. 1 and 2 is combined with a source spatial decorrelator (SSD) 200 to increase the optical fill ratio or factor of the thermal cell. The use of the SSD 200 provides a cost effective means of significantly increasing the apparent fill factor of the thermal cell to nearly 100% if desired. The SSD 200 includes an aperture 205 which is located above and vertically aligned with the heater element 105 of the infrared source element 100. It should be noted that although the infrared source element 100 is shown to be centered over the cavity 125 formed in the semiconductor substrate 100, it could be located anywhere over the cavity as is well understood in the art. The aperture 205 in the SSD 200 is preferably in the shape of a truncated inverted pyramid with reflective side surfaces 210. The four surfaces 210 of the aperture 205 are defined by planes, each of which forms an angle θ of about 10° from the primary surface 220 of the decorrelator 200 for an optical projection device having, nominally, a focal ratio of 4. The optical projection device is focused on primary surface 215 to realize full benefit of invention. Any SSD geometry that provides close packing, e.g., rectangular, square, hexagon, etc., could be utilized. A cone shape can also be used, but would have a somewhat lower packing factor. The reflective surfaces 210 reflect the infrared signals generated by the resistive heater element 105 thereby spreading the flux at the opening in the primary surface 215 of the SSD 200 to provide a fill factor of up to approximately 100%. The effect is to provide a thermal cell with performance which would otherwise require a substantially larger heater element.

The SSD is a non-imaging optical component that spreads, by 0, 1, 2, . . . n reflections from the surfaces 210, the flux emitting from a point on the heater element over most of the distal surface of the SSD. The flux from all of the emitting points on the source is spread or blended over the distal surface thereby changing the apparent spatial geometry of the heater element and spatially smoothing out any non-uniform flux distribution which may exist upon the heater element. Further, in conventional optical configurations, when viewing a thermal heater having a nominally flat surface sensibly emitting radiometrically into or about a hemisphere, the faction of the emitted flux collected by the projection optics is approximately the square of the optical numerical aperture (N.A.), assuming the heater element has Lambertian goniometric characteristics. A similar relation exists for other goniometric characteristics. The SSD provides a notable improvement in the radiometric collection efficiency which can approach $(N.A.)^{-2}$. This can be understood as increasing the apparent flux from the heater element. Increased separation between the heater element and SSD will however reduce the improvement in efficiency by obvious geometric relationships.

The SSD 200 is located such that primary surface 220 is disposed in close proximity to the primary surface 122 of the infrared source element 100. Beneficially, the separation distance between primary surfaces 122 and 220 will be less than 5μm, although this could vary for specific applications. The primary surfaces 122, 215 and 220 of the SSD 200 and of the infrared source element 100 are substantially parallel. The mechanical fill factor resulting from the use of the SSD 200 is related to the ratio of the thickness t of the SSD 200 to the slope of the reflective surfaces 210. If this ratio falls below a threshold value, e.g. 1.5, the optical fill factor begins to decrease, as will be discussed further below.

The infrared signals exiting the SSD 200 at the primary surface 215 illuminate the opening in surface 215 much more uniformly than the illumination of the opening in surface 220 of SSD 200. The flux is also concentrated into a much smaller solid angle. With respect to imaging, the radiance at the opening in the primary surface 215 of the SSD 200 will be essentially the same as that of the heater element 105 at the primary surface 122 of the infrared source element 100 given appropriate geometry such that the area-solid angle product at each aperture of SSD 200 is about the same. Accordingly, at primary surface 215 of the SSD 200, a mechanical fill factor approaching 100% is obtained as $w_1$ approaches the pitch of the infrared source elements.

The SSD 200 is mounted in close proximity to the upper primary surface of the 122 of the infrared source element 120. Beneficially, the distance d separating primary surface 220 of the SSD 200 from primary surface 122 of the infrared source element 100 is as close a practicable, for example nominally 5 μm or less. The SSD 200 may be fabricated by electro-forming nickel over an aluminum mandrel or otherwise. Light entering the SSD may undergo multiple reflections which spatially decorrelates or scrambles the light to produce a nominally uniform flux distribution over the exit aperture, i.e. the opening in primary surface 215 of SSD 200.

The combination of the infrared source 100 and SSD 200 forms a hybrid optical device. As discussed above, the principle factor in determining how well filled the SSD exit aperture, i.e. the opening in primary surface 215 of SSD 200, will be is the ratio of the thickness t of the SSD 200 to the slope of the side surfaces 210, and to the ratio of the widths $w_1$ and $w_2$ of the aperture in the primary surfaces 215 and 220 of the SSD 200. The side slope is given by:

$$\text{Arctan}\left(\frac{w_1 - w_2}{2t}\right) \tag{1}$$

As will be discussed further below, in a thermal cell matrix, the pitch or center-to-center spacing of the apertures 205 in the SSD's 200 will substantially equal the exit aperture width $w_1$ when the mechanical fill factor approaches 100%. The side wall angles are about:

$$\text{Arctan}\left(\frac{P - w_1}{2t}\right). \tag{2}$$

The effectiveness of the SSD to improve the fill factor and the radiometric flux collection is determined primarily by the ratio of the SSD thickness to pixel pitch P and the ratio of $w_1$ to $w_2$. Furthermore, for an optical projection element having a focal ratio of FNO, a heater element of width $w_2$ and an SSD thickness of t, the value of $w_1$ for preferred operation should be in the range of:

$$(W_2 + t/FNO) < W_1 < P. \tag{3}$$

To accommodate for a finite field-of-view of the optical projection element, the N.A. should be appropriately increased. From the SSD geometry previously described, the minimum desirable FNO for an optical projection element, having a very small field-of-view, for a given SSD configuration is:

$$FNO_{min} = t/(W_1 - W_2) \tag{4}$$

Other geometric and optical relationships will be evident to those skilled in the art. For example, the first-order geometrically illuminated angular region exiting from the SSD is:

$$\text{Arctan}\{(W_1 + W_2)/2t\} \tag{5}$$

where the preferred operational region is determined by the SSD side wall angle by formula (1) above. By the laws of geometrical optics, the optically filled portion of the SSD is dependent upon t/P. For $w_1/w_2 = 3.5$ and $w_1 = P$, the optical fill factor determined by computer modeling is about 25% for a t/P=0.58, about 50% for t/P =0.83, and approaching 100% for t/P >1.5.

It should be recognized that diffraction of the radiometric flux by the SSD may further spread the angular flux distribution. Consequently, practical design and application of the SSD should consider diffraction when appropriate. In addition, the walls of the SSD should be nominally specular for best performance. Diffused wall surfaces will degrade the efficiency gains otherwise obtainable.

The SSD may be fabricated of silicon with the aperture 205 formed by anisotropic etching using known techniques. Although different techniques may be utilized, a pattern silicon oxide approach appears to be both simpler and more effective than an ion-implementation approach for etch stopping.

As discussed above, an SSD side wall angle of about 10° beneficially provides the optimum fill factor for FNO =4. The distance d between the primary surface 122 of the infrared source element 100 and the primary surface 220 of the SSD 200 is small, preferably on the order of 5 micrometers or less. Accordingly, the infrared source element 100 and SSD 200 form a hybrid optical device 300 which increases the fill factor otherwise obtainable in a thermal cell array known in the art. If the SSD 200 is formed of silicon, the hybrid device 300 could be formed monolithically as will be further disclosed below.

Figures 4, 4A:
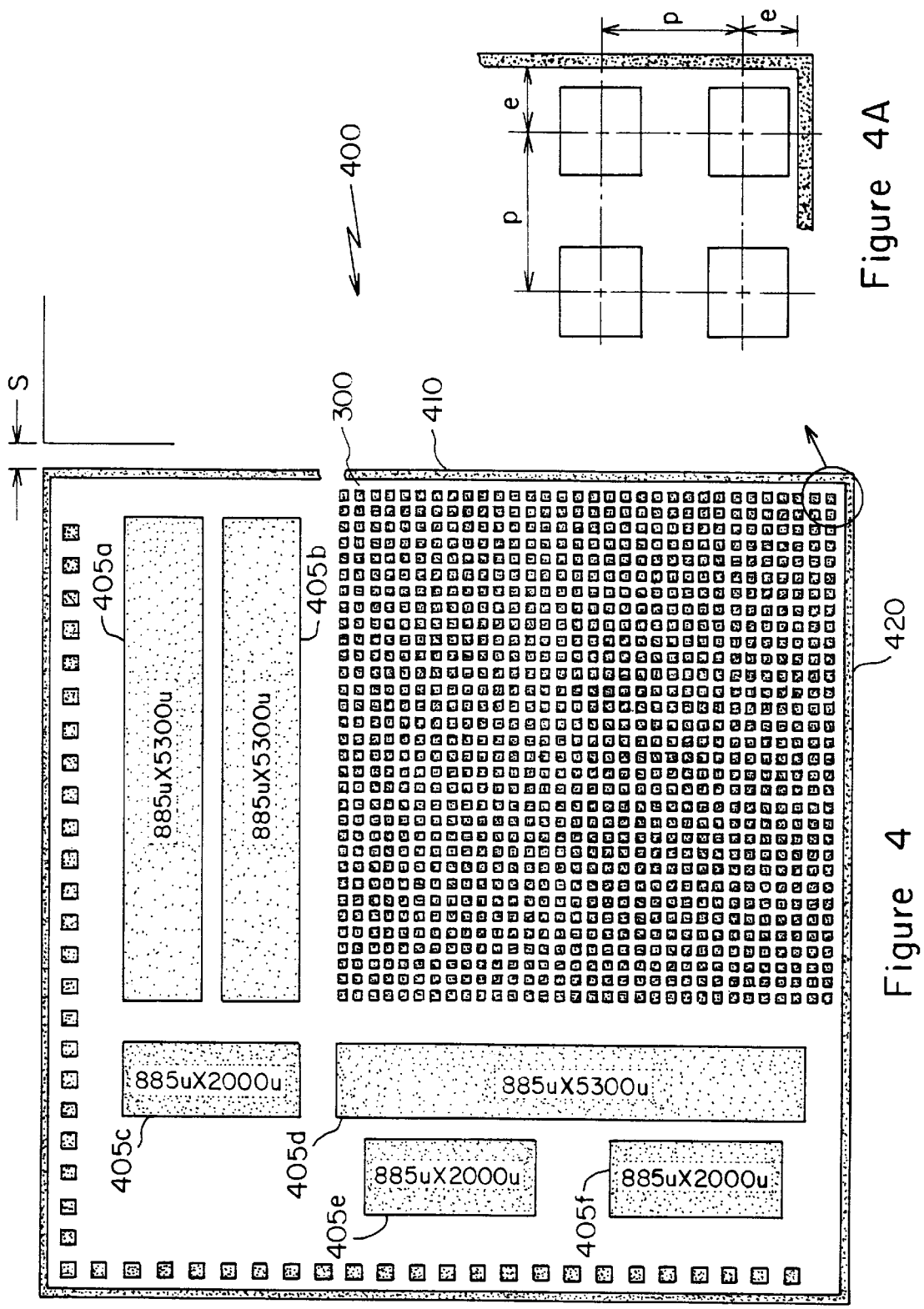
FIG. 4 depicts a thermal cell array on a monolithic integrated circuit chip and having a matrix of the thermal cells depicted in FIG. 3 and including associated circuitry integrated on the semiconductor substrate.
FIG. 4A is an enlarged view of a portion of FIG 4.

In many practical applications, an array of thermal cells is required. FIG. 4 depicts an array 400 of the thermal cells 300 depicted in FIG. 3 formed in a mosaic array architecture. A 32×32 cell array is depicted. The entire array is formed on a single integrated circuit chip. Each individual cell or pixel 300 has a pitch of P. Associated circuitry 405a–f is provided for driving, controlling and monitoring the cell array. Each pixel and the associated circuit is a fundamental unit and makes the array architecture amenable to large array designs by simply adding to the number of abutting pixel units and increasing the capability of associated circuitry to drive, control and monitor the added pixels. The associated circuitry 405a–f can be easily designed to provide robust control, such that the activation or deactivation of individual rows or columns of the array are driven in a manner desirable for the intended application. The control function of the associated circuitry 405a–f sets the operating current and thereby the temperature for each pixel.

The distance e from the edge to each adjacent cell 300 of array 400 is slightly less than one-half the centerline-to-centerline distance between cells, Accordingly, if desired, another array can be located next to the array 400, with a small separation distance s between the opposing side edges. The separation distance s may be selected such that the pixel pitch P is maintained between the respective arrays on the separate chips. This will facilitate the formation of even larger arrays as discussed below.

Figure 5:
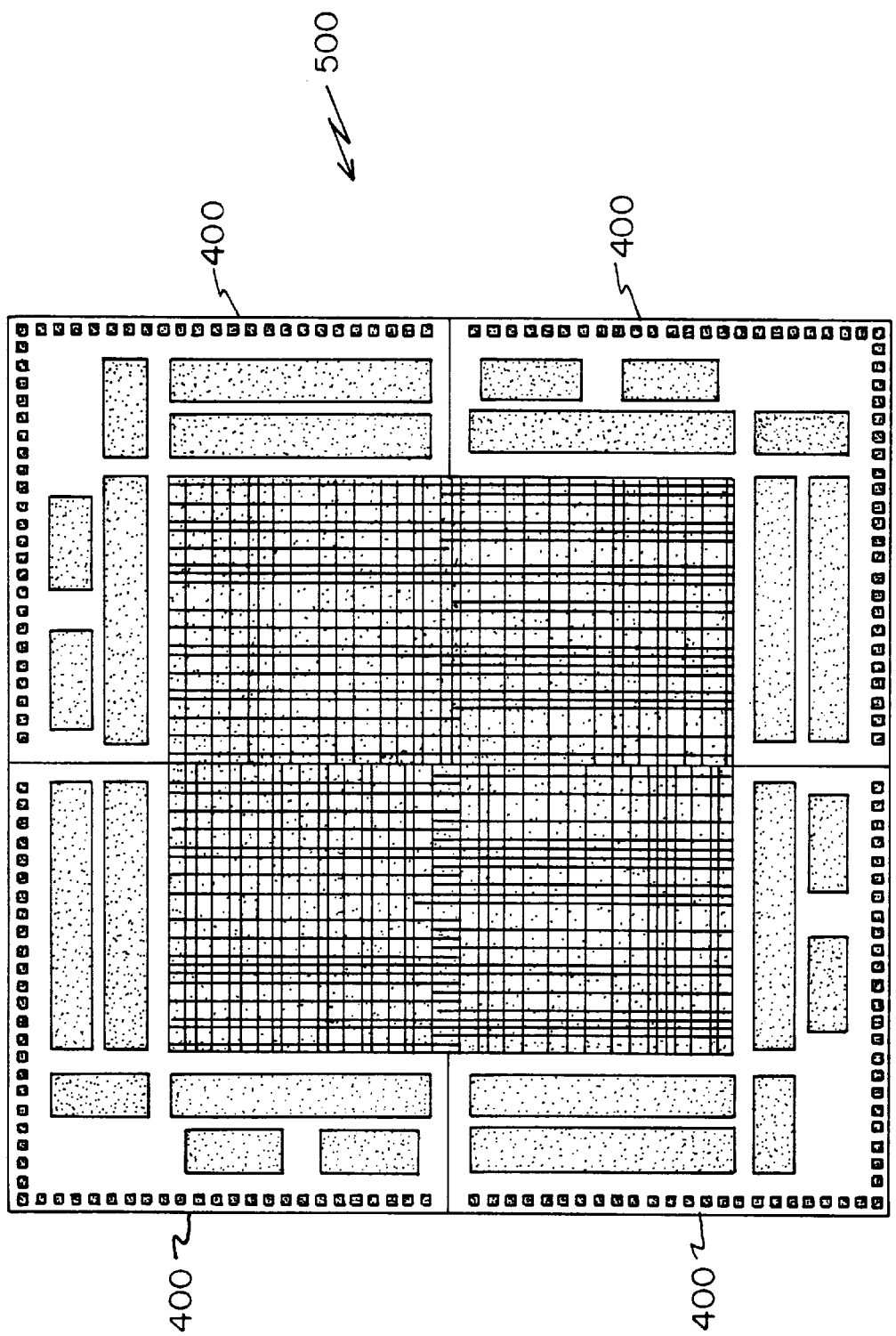
FIG. 5 depicts the combination of the multiple terminal cell arrays as depicted in FIG. 4 to form a large thermal cell array which can be manufactured using conventional IC based processes.

To form even larger mosaic arrays, for example 256×256 or even larger cell arrays, multiple chip arrays 400 can be combined as shown in FIG. 5 to form mosaic arrays without the need to fabricate the entire array on a single chip. As shown in FIG. 5, individual array chips each having a 64×64 cell array are abutted to form a 128×128 cell array. Each individual wafer forms a quadrant of the total array. By locating the electronics associated with each cell array along only two adjacent edges of the pixelated area, opposing edges of adjacent array chips which are at least in part free of electronics can abut each other to form the larger composite mosaic array 500 as illustrated in FIG. 5. A uniform pitch is maintained without the edges of the respective array chips actually coming into contact with each other as discussed above. The edges of the respective array chips are disposed in close proximity so that the distance between adjacent pixels of the abutting chips have a center-line-to-center-line distance which is equal to the center-line-to-center-line distance of adjacent pixels on each respective wafer. In this way, a uniform pitch can be maintained throughout the multiple wafer mosaic thermal cell array 500.

By forming the large thermal cell array using multiple chips, lower yields due to the distribution of defects over large silicon wafers, is avoided. For every doubling of the array's dimension, the area of the chip quadruples and hence results in an approximate quadrupling of the possibility of defects occurring in the array. By manufacturing respective portions of a large mosaic thermal cell array on individual chips and butting the respective chips, the yield of the thermal source array is improved.

Further, the manufacturing of mosaic arrays on a single chip using standard commercial IC fabrication techniques, such as CMOS, is normally limited to four to six inch wafers; although it may be possible to manufacture an array on an 8-inch or larger wafer under certain circumstances. In general, the largest thermal cell array which can be formed on a four inch wafer is limited to 256×256 cells using 2 μm CMOS fabrication technology. On a six-inch wafer, the maximum array is approximately 512×512 cells. However, using the technique described above, a cell array of 1024× 1024 thermal cells is easily formed using multiple chips each having a portion of the thermal cell array formed thereon.

If the SSD 200 is formed by electro-forming nickel over an aluminum mandrel or the hybrid optical device 300 is not monolithically formed for some other reason, a technique utilizing microspheres has been developed to separate and support the SSD 200 from the infrared source element 100. The technique also facilitates alignment of the aperture 205 in the SSD 200 with the resistive heater element 105 which is centered over the cavity 125 of the semiconductor substrate 120. Further still, the technique also makes it relatively easy to ensure that the primary surfaces 215 and 220 of the SSD 200 are parallel to the primary surface 122 of the infrared source element 100. Additionally, because for certain applications it may be desirable to bond the SSD 200 to the infrared source element 100, while for other applications it may be desirable to have the SSD 200 removable, though supported, from the infrared source element 100, the technique has the flexibility to be utilized in either type of application.

Figure 6:
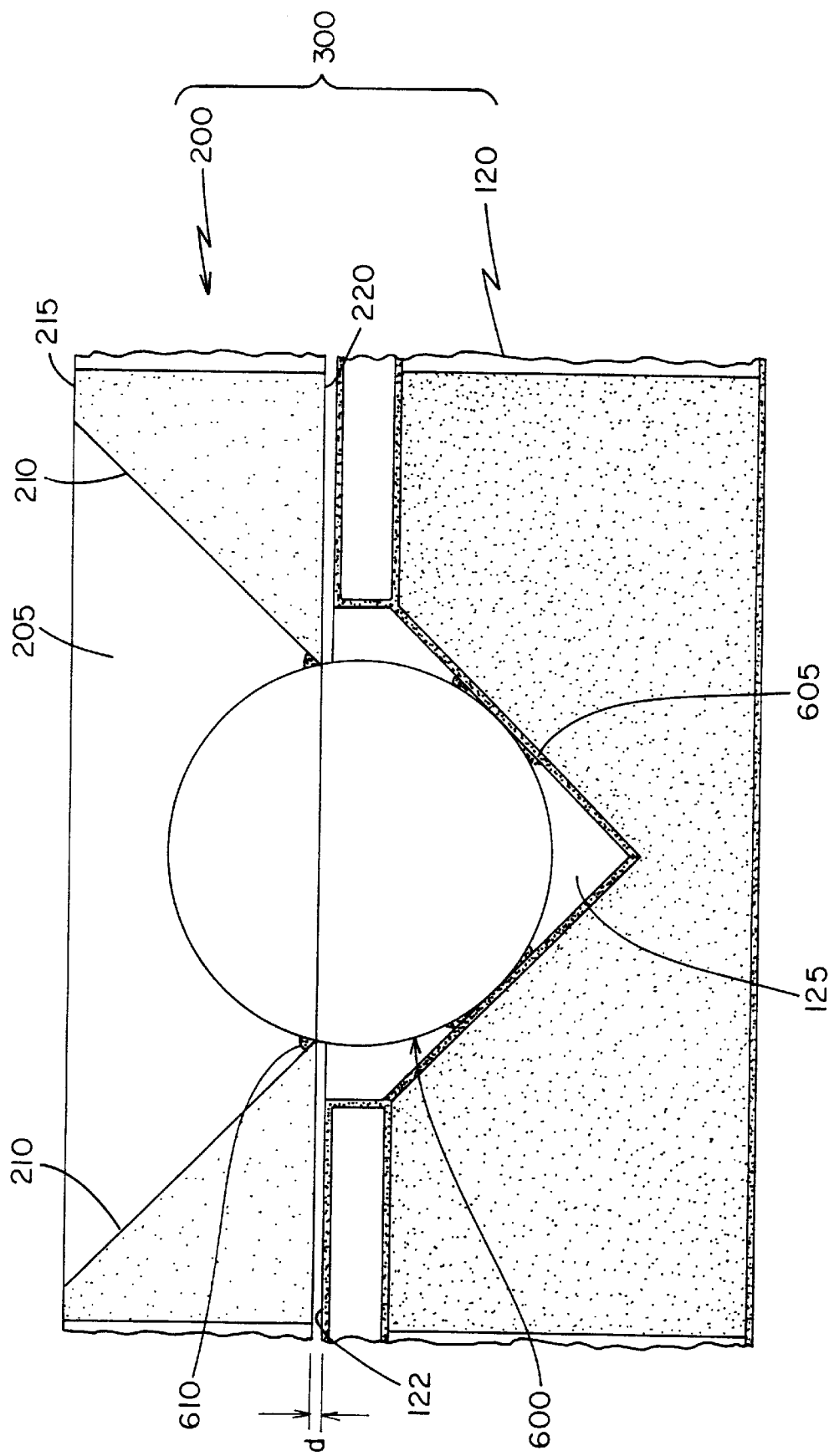
FIG. 6 is a cross section of a microsphere which support and spaces different components of the thermal cell array depicted in FIG. 4 in accordance with the present invention.

In accordance with the present invention, supporting and spatially locating the SSD 200 from the infrared source element 100 and aligning the SSD aperture 205 with the heater element 105 is accomplished by locating microspheres in pits in the substrate 120 and the SSD 200. The pits can be outside of the pixelated area if desired. FIG. 6 depicts a thermal cell 300' which can be substituted for selected thermal cells 300 in the FIG. 4 thermal cell array 400. For example, 300' could be substituted for cells 300 at the four corners of the matrix or at any other locations which may be desirable under the particular circumstances to support the SSD 200 from the infrared source element 100. FIG. 6 is similar to FIG. 3 except the infrared generating cell components 105, 115a–d and 130a–b are not provided over the cavity 125 in the semiconductor substrate 120 with which an aperture 205 in the SSD 200 is to be aligned. Instead, a microsphere 600 is inserted into the cavity 125. With the microsphere 600 inserted in cavity 125, the appropriate aperture 205 can be lowered over the microsphere 600 until edges of the opening in the lower primary surface 220 of the SSD 200 bear against the microsphere 600. The weight of the SSD 200 is transferred through the microsphere 600 to the walls of the cavity 125, thereby providing support for the SSD 200 by the semiconductor substrate 120. The size of the microsphere 600 can be selected such that the desired distance d is maintained between the surface 220 of the SSD 200 and the surface 122 of the substrate 120. Further, because of the geometric nature of microsphere 600, the aperture 205 will be self-centering on the microsphere 600 which is in turn self-centering within the cavity 125.

Microspheres 600 may be formed of any desired material. If so desired, the microsphere 600 can be bonded to one or more walls of the cavity 125 by an appropriate adhesive 605 or by any other means which may be desirable under the circumstances. By bonding the microsphere 600 to the walls of the cavity 125, the separation of the microsphere 600 from the substrate 120 is avoided. However, the flexibility of supporting different SSD's using different sized microspheres is thereby sacrificed.

Should a fixed hybrid cell array be desired for the particular application, the SSD 200 can also be bonded to the microsphere 600 by an appropriate adhesive or other bonding material 610, as shown in FIG. 6. As a still further alternative which may be beneficial for certain applications, the SSD 200 may be bonded to the microsphere 600 by bonding material 610 without bonding the microsphere to the substrate 120. In this latter alternative, flexibility is retained to combine the infrared source element formed on substrate 120 with different SSD's having microspheres attached. It should be noted that the separation of SSD from the infrared source element could be accomplished by any number of differently shaped items, e.g., micro-cylinder or micro-tubes, etc. Although the self-centering or alignment means of SSD to the substrate 120 and infrared source elements 100 is preferred, any alternative alignment, separation, and bonding means could be employed.

Figure 7:
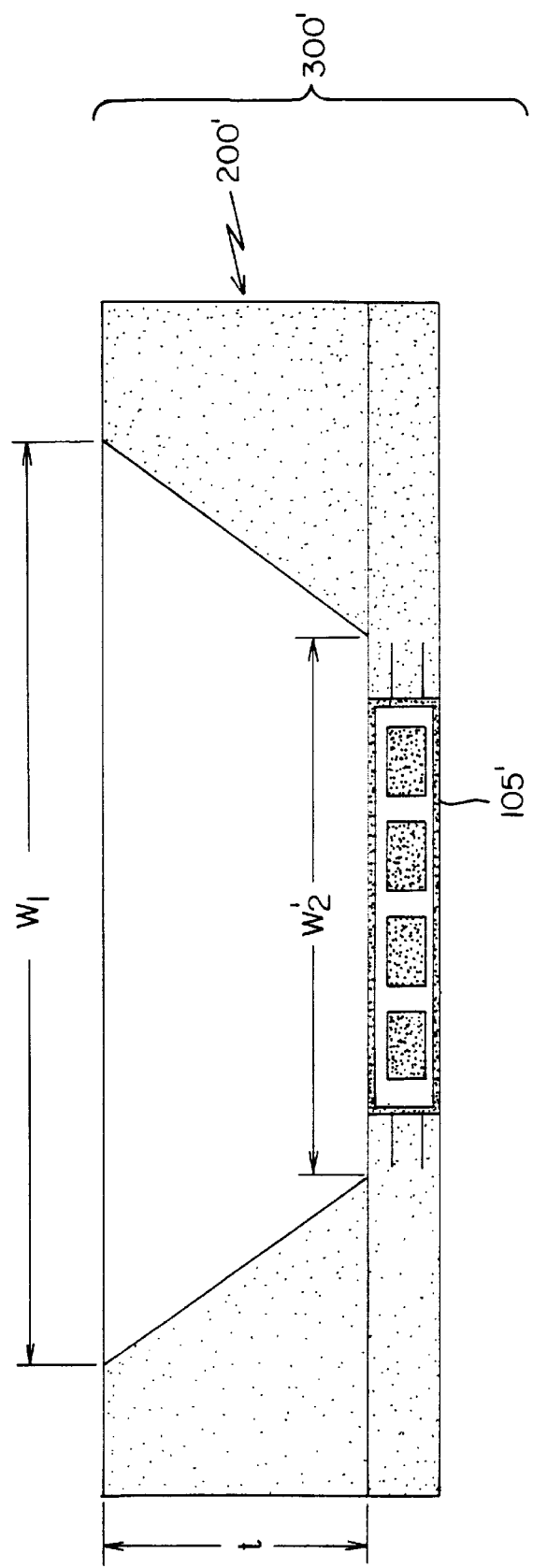
FIG. 7 is cross-section of a monolithic thermal cell with an integrated spatial decorrelator and infrared source in accordance with the present invention.

FIG. 7 depicts a monolithic integrated thermal cell 300' in accordance with the present invention. As shown, the infrared source element 105' is monolithically integrated with a source spatial decoder 200', which is substantially similar to the source spatial decorrelator 200 of FIG. 3. As shown, the source spatial decorrelator 200' directly supports the heater element 105'. The opening $w_2'$ is somewhat larger than the opening $w_2$ to provide proper thermal isolation between the heater element 105' and the decorrelator 200'. It will be understood that the depicted monolithic thermal cell functions in a manner substantially similar to that described above.

A further advantage of the present invention is that the SSD substantially blocks radiometric flux emitted by non-heater element devices or area from being viewed by the optical projection device. Said non-heater element flux can contaminate the desired radiometric signal thereby reducing the utility of any thermal cell array form.

As described above, the present invention provides a thermal cell and thermal cell array with a substantially improved optical fill factor which is easily manufactured utilizing standard commercial processes. The invention can be utilized to produce large mosaic arrays with reduced defects and enhanced performance characteristics. Although the invention has been described with respect to its use as an infrared signal generator, its application is not necessarily limited thereto. Those skilled in the art will recognize other applications in which the techniques described herein can be utilized. For example, it is conceivable that the invention may find application for use in optical signal detection including optical imaging.

Novel features and characteristics of the invention are set forth in the appended claims. The invention itself, however, as well as other features, advantages and benefits thereof, will be best understood by reference to the above detailed description and the accompanying drawings.

We claim:

1. A thermal cell comprising:
   an infrared source element for producing an infrared signal, having a primary emitting surface and an infrared generating cell;
   a spatial decorrelator element disposed above and spaced apart from said infrared source element and having an aperture formed therein and through which said infrared signal radiates, for spatially decorrelating said infrared signal;
   wherein said aperture extends between a first surface and a second surface of said decorrelator element and is defined by a side wall adapted to reflect said infrared signal, said aperture having a centerline substantially orthogonal to said primary emitting surface,
   wherein said first surface and said second surface of said decorrelator element are substantially parallel with said primary emitting surface,
   wherein said first surface is in a first plane and said aperture has a first area in said first plane, and
   wherein said second surface is in a second plane and said aperture has a second area in said second plane, said second area being greater than said first area,
   wherein the area of said primary emitting surface is defined by the first area in the first plane.

2. A thermal cell according to claim 1, wherein said first surface is disposed proximate to said primary emitting surface.

3. A thermal cell according to claim 1, wherein said signal decorrelator element spatially decorrelates said infrared signal so that a first optical fill ratio of said infrared signal at said second surface of said decorrelator element is greater than a second optical fill ratio of said infrared signal at said primary substrate surface, said first and said second fill ratios being computed by dividing an area over which said infrared signal is radiated by an area of said primary emitting surface.

4. A thermal cell according to claim 1, wherein said signal decorrelator element spatially decorrelates said infrared signal so that a signal radiance of said infrared signal at said second surface of said decorrelator element is approximately equal to a signal radiance of said infrared signal at said primary emitting surface.

5. A thermal cell according to claim 1, wherein said aperture is formed as a truncated inverted pyramid.

6. A thermal cell according to claim 1, wherein said infrared source element has one or more infrared generating cells and the second area is substantially equal to an area of said one or more infrared generating cell.

7. A thermal cell array comprising:
   an infrared source element for producing an infrared signal, including a primary emitting surface and a plurality of infrared generating cells;
   a spatial decorrelator element disposed above and spaced apart from said infrared source element and having a plurality of apertures formed therein, for spatially decorrelating said infrared signal;
   wherein each of said plurality of apertures extends between a first surface and a second surface of said decorrelator element and is defined by a side wall adapted to reflect said infrared signal, each said aperture having a centerline substantially orthogonal to said primary emitting surface,
   wherein said first surface and said second surface of said decorrelator element are substantially parallel with said primary emitting surface, and said first surface is disposed proximate to said primary emitting surface, wherein said first surface is in a first plane and each of said plurality of apertures has a first area in said first plane, and wherein said second surface is in a second plane and each of said plurality of apertures has a second area in said second plane, said second area being greater than said first area, wherein the area of said primary emitting surface is defined by the first area in the first plane.

8. A thermal cell array according to claim 7, wherein said decorrelator element spatially decorrelates said infrared signal so that a first fill ratio of said infrared signal at said second surface of said decorrelator element is greater than a second fill ratio of said infrared signal at said primary emitting surface, said first and said second fill ratios being computed by dividing an area over which said infrared signal is radiated by an area of said primary emitting surface.

9. A thermal cell array according to claim 7, wherein said decorrelator element spatially decorrelates said infrared signal such that a signal radiance of said infrared signal at said second surface of said decorrelator element is approximately equal to a signal radiance of said infrared signal at said primary emitting surface.

10. A thermal cell array according to claim 7, wherein each of said plurality of apertures is formed as a truncated inverted pyramid.

11. A thermal cell array according to claim 7, wherein said primary emitting surface has a plurality of cavities formed therein and further comprising a plurality of microspheres each disposed in a respective one of said plurality of cavities for spacing said decorrelator element apart from said infrared source element.

12. A thermal cell array according to claim 11, wherein each of said plurality of microspheres is disposed in a respective one of said plurality of apertures.

13. A thermal cell array according to claim 12, wherein each of said plurality of microspheres is fixedly mounted in said respective one of the plurality cavities and said respective one of the plurality of apertures.

14. A thermal cell array comprising:

an infrared source element for producing an infrared signal, including a first substrate having a first side surface and a first primary emitting surface and a plurality of first infrared generating cells, and a second substrate having a second side surface and a second primary emitting surface and a plurality of second infrared generating cells, said first and said second primary emitting surfaces being disposed in a common plane;

wherein said first substrate and said second substrate are positioned such that said first side surface is opposed to said second side surface, the first substrate includes first control circuitry operatively connected to the plurality of first infrared generating cells and the second substrate includes second control circuitry operatively connected to the plurality of second infrared generating cells.

15. A thermal cell array according to claim 14, further comprising:

a spatial decorrelator element disposed above and spaced apart from said infrared source element and having a plurality of apertures formed therein, for spatially decorrelating said infrared signal;

wherein each of said plurality of apertures extends between a first surface and a second surface of said decorrelator element and is defined by a side wall adapted to reflect said infrared signal, each said aperture having a centerline substantially orthogonal to said common plane, wherein said first and said second surfaces of said decorrelator element are substantially parallel with said common plane, and said first surface is disposed proximate to said common plane, wherein said first surface is in a first plane and each of said plurality of apertures has a first area in said first plane, and wherein said second surface is in a second plane and each of said plurality of apertures has a second area in said second plane, said second area being greater than said first area.

16. A decorrelator element for use in a thermal cell having an infrared source element for producing an infrared signal, including a primary emitting surface and an infrared generating cell, comprising:

a first surface disposed in a first plane;

a second surface disposed in a second plane;

an aperture formed between said first surface and said second surface and having a centerline substantially orthogonal to said primary emitting surface, said aperture being defined by a side wall adapted to reflect radiating infrared signals to thereby spatially decorrelate said radiating infrared signals;

wherein said aperture has a first area in the first plane and a second area in said second plane, said second area being greater than said first area, wherein the area of said primary emitting surface is defined by the first area in the first plane.

17. A decorrelator element according to claim 16, wherein said decorrelator is positionable such that said first and said second surfaces are substantially parallel with said primary emitting surface, and said first surface is proximate to but separated from said primary emitting surface.

18. A decorrelator element according to claim 16, wherein said aperture is shaped as a truncated inverted pyramid and said first surface is disposed so as to block radiometric flux emitted from other than said infrared source element from radiating from said second surface.

19. A monolithic thermal cell comprising:

an infrared source having a primary emitting surface for producing the infrared signal; and a spatial decorrelator disposed above and spaced apart from said infrared source element and having an aperture formed therein and through which said infrared signal radiates, for spatially decorrelating said infrared signal; and wherein said infrared source is monolithically integrated with said spatial decorrelator;

wherein said aperture extends between a first surface and a second surface of said decorrelator element and is defined by a side wall configured to reflect said infrared signal, said aperture having a centerline substantially orthogonal to said primary emitting surface, and wherein said first surface and said second surface of said decorrelator element are substantially parallel with said primary emitting surface, and said first surface is disposed substantially in the plane of said primary emitting surface, wherein said first surface is in a first plane and said aperture has a first area in said first plane, said second surface is in a second plane and said aperture has a second area in said second plane, said second area being greater than said first area, and the area of said primary emitting surface is defined by the first area in the first plane.

20. A thermal cell according to claim 19, wherein said signal decorrelator spatially decorrelates said infrared signal so that a signal radiance of said infrared signal at said second surface of said decorrelator element is approximately equal to a signal radiance of said infrared signal at said primary emitting surface.

21. A thermal cell array, comprising:

an infrared source element for producing an infrared signal, including a first substrate having a first side surface, a first primary emitting surface and a plurality of first infrared generating cells having a substantially constant spacing therebetween, and a second substrate having a second side surface, a second primary emitting surface and a plurality of second infrared generating cells having said substantially constant spacing therebetween, said first and said second primary substrate surfaces being disposed in a common plane;

wherein said first substrate and said second substrate are positioned such that said first side surface is opposed to said second side second surface and adjacent cells of said plurality of first infrared generating cells and said plurality of second infrared generating cells are separated by said substantially constant spacing, wherein the area of the first and second primary emitting surfaces is less than the area of the first and second primary substrate surfaces, respectively.

22. A thermal cell array according to claim 21, further comprising a spatial decorrelator element disposed above and spaced apart from said infrared source element and having a plurality of apertures formed therein, for spatially decorrelating said infrared signal;

wherein each of said plurality of apertures extends between a first surface and a second surface of said decorrelator element and is defined by a side wall adapted to reflect said infrared signal, each said aperture having a centerline substantially orthogonal to said common plane, wherein said first and said second surfaces of said decorrelator element are substantially parallel with said common plane, and said first surface is disposed proximate to said common plane, wherein said first surface is in a first plane and each of said plurality of apertures has a first area in said first plane, and wherein said second surface is in a second plane and each of said plurality of apertures has a second area in said second plane, said second area being greater than said first area.

23. A thermal cell array according to claim 21, wherein said first substrate includes first control circuitry operatively connected to the plurality of the first infrared generating cells and the second substrate includes second control circuitry operatively connected to the plurality of second infrared generating cells.

* * * * *